(12) United States Patent
Kim et al.

(10) Patent No.: US 7,986,680 B2
(45) Date of Patent: Jul. 26, 2011

(54) TRANSMIT FORMAT SELECTION WITH CONSIDERATION FOR RESOURCE REUSE

(75) Inventors: Byoung-Hoon Kim, San Diego, CA (US); Durga Prasad Malladi, San Diego, CA (US); Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1181 days.

(21) Appl. No.: 11/408,477

(22) Filed: Apr. 21, 2006

(65) Prior Publication Data

US 2006/0255989 A1  Nov. 16, 2006

Related U.S. Application Data

(60) Provisional application No. 60/676,123, filed on Apr. 28, 2005.

(51) Int. Cl.
*H04W 4/00* (2009.01)
*H04W 72/00* (2009.01)
*H04B 7/216* (2006.01)
*H04B 17/00* (2006.01)

(52) U.S. Cl. ........ 370/341; 370/342; 370/441; 455/450; 455/67.11

(58) Field of Classification Search .................. 370/320, 370/341, 342, 441; 455/450, 452.1, 452.2, 455/67.11
See application file for complete search history.

(56) References Cited

U.S. PATENT DOCUMENTS

| | | | |
|---|---|---|---|
| 2003/0114162 A1* | 6/2003 | Chheda et al. | 455/447 |
| 2004/0100941 A1 | 5/2004 | Lim et al. | |
| 2004/0196919 A1 | 10/2004 | Mehta et al. | |
| 2006/0160556 A1* | 7/2006 | Mueller et al. | 455/522 |

FOREIGN PATENT DOCUMENTS

| | | |
|---|---|---|
| EP | 1389848 A1 | 2/2004 |
| EP | 1416753 A1 | 5/2004 |
| EP | 1458205 A2 | 9/2004 |
| JP | 2001237751 | 8/2001 |
| JP | 2003235072 | 8/2003 |
| JP | 2004523934 | 8/2004 |
| JP | 2004248075 | 9/2004 |
| JP | 2005535221 | 11/2005 |
| JP | 2006526353 | 11/2006 |
| WO | WO2005008931 | 1/2005 |
| WO | 2005032154 A2 | 4/2005 |

OTHER PUBLICATIONS

"Universal Mobile Telecommunications System (UMTS); Physical layer procedures (FDD) (3GPP TS 25.214 version 6.5.0 Release 6); ETSI TS 125 214" ETSI Standards, European Telcommunications Standards Institute, Sophia-Antipo, FR. vol. 3-R1, No. V650, Mar. 2005, p. 39-46.

International Search Report and Written Opinion—PCT/US2006/016301, International Search Authority—European Patent Office—Jan. 30, 2007.

* cited by examiner

*Primary Examiner* — Un C Cho
(74) *Attorney, Agent, or Firm* — Charles E. Eggers

(57) ABSTRACT

Techniques for selecting transmit formats in a manner to account for the degrees of resource reuse for multiple data streams sent simultaneously from multiple antennas are described. The degree of resource reuse for each data stream indicates the amount of reuse of resources (e.g., orthogonal codes or subcarriers) observed by that stream. Interference estimates for the multiple data streams are derived based on an initial resource assignment. The degrees of resource reuse are determined based on the interference estimates and are used to derive at least one correction factor. At least one transmit format is then selected for the data streams using the at least one correction factor. Each data stream is associated with a transmit format that indicates the amount of resources to use for the data stream and other parameters. Resources are assigned to each data stream in accordance with its transmit format.

24 Claims, 6 Drawing Sheets

TRANSMIT FORMAT SELECTION WITH CONSIDERATION FOR RESOURCE REUSE

CLAIM OF PRIORITY UNDER 35 U.S.C. §119

The present Application for Patent claims priority to Provisional Application Ser. No. 60/676,123, entitled "Code-Reuse Dependent Selection of Modulation Coding Scheme in Adaptive-Rate MIMO Multicode CDMA System," filed Apr. 28, 2005, assigned to the assignee hereof, and expressly incorporated herein by reference.

BACKGROUND

I. Field

The present disclosure relates generally to communication, and more specifically to techniques for selecting transmit formats in a wireless communication system.

II. Background

In a wireless communication system, a transmitter typically processes (e.g., encodes, modulates, and channelizes) traffic data in accordance with a transmit format selected for use and generates output chips. A transmit format may also be referred to as a rate, a modulation coding scheme (MCS), a packet format, a transport format, a transmission mode, and so on. A transmit format may indicate various parameters to use for transmission such as a coding scheme, a code rate, a modulation scheme, a data block size, a number of code channels or subcarriers, and so on. The transmitter then processes the output chips to generate a modulated signal and transmits this signal via a wireless channel. The wireless channel distorts the transmitted signal with a channel response and further degrades the signal with noise and interference.

A receiver receives the transmitted signal and processes the received signal to obtain samples. The receiver then processes (e.g., dechannelizes, demodulates, and decodes) the samples in accordance with the selected transmit format to obtain decoded data. The receiver may estimate the received signal quality, e.g., based on a pilot sent by the transmitter. The transmitter and/or receiver may select an appropriate transmit format to use for an upcoming time interval based on the received signal quality.

Transmit format selection refers to the selection of an appropriate transmit format to use for transmission based on channel conditions and other relevant factors. Transmit format selection has a large impact on system performance and is challenging for a time-varying system. Transmit format selection is even more challenging in a multiple-input multiple-output (MIMO) system that employs multiple transmit antennas for data transmission to multiple receive antennas. The transmissions from the multiple transmit antennas interfere with one another, thereby making it more difficult to accurately estimate the received signal quality and select suitable transmit formats for use.

There is therefore a need in the art for techniques to effectively select transmit formats in a MIMO system.

SUMMARY

Techniques for selecting transmit formats in a manner to account for the degrees of resource reuse observed by data streams sent from multiple transmit antennas are described herein. The degree of resource reuse for each data stream is indicative of the amount of reuse of resources observed by that stream. The techniques may provide more accurate selection of transmit formats so that the data streams may be sent at closer to the capacity of a wireless channel.

According to an embodiment of the invention, an apparatus is described which includes at least one processor and a memory. The processor(s) determine at least one correction factor based on degrees of resource reuse for multiple data streams sent from multiple antennas. The processor(s) select at least one transmit format for the multiple data streams using the at least one correction factor.

According to another embodiment, a method is provided in which at least one correction factor is determined based on degrees of resource reuse for multiple data streams sent from multiple antennas. At least one transmit format is selected for the multiple data streams using the at least one correction factor.

According to yet another embodiment, an apparatus is described which includes means for determining at least one correction factor based on degrees of resource reuse for multiple data streams sent from multiple antennas, and means for selecting at least one transmit format for the multiple data streams using the at least one correction factor.

According to yet another embodiment, an apparatus is described which includes at least one processor and a memory. The processor(s) derive interference estimates for multiple data streams based on an initial resource assignment. The multiple data streams are sent simultaneously from multiple antennas, and the interference estimates are for inter-stream interference. The processor(s) control at least one parameter of the multiple data streams based on the interference estimates. The at least one parameter may relate to transmit format, transmit power, resource assignment, and so on.

According to yet another embodiment, a method is provided in which interference estimates for multiple data streams are derived based on an initial resource assignment. At least one parameter of the multiple data streams is controlled based on the interference estimates.

According to yet another embodiment, an apparatus is described which includes means for deriving interference estimates for multiple data streams based on an initial resource assignment, and means for controlling at least one parameter of the multiple data streams based on the interference estimates.

Various aspects and embodiments of the invention are described in further detail below.

DETAILED DESCRIPTION

Figure 1:
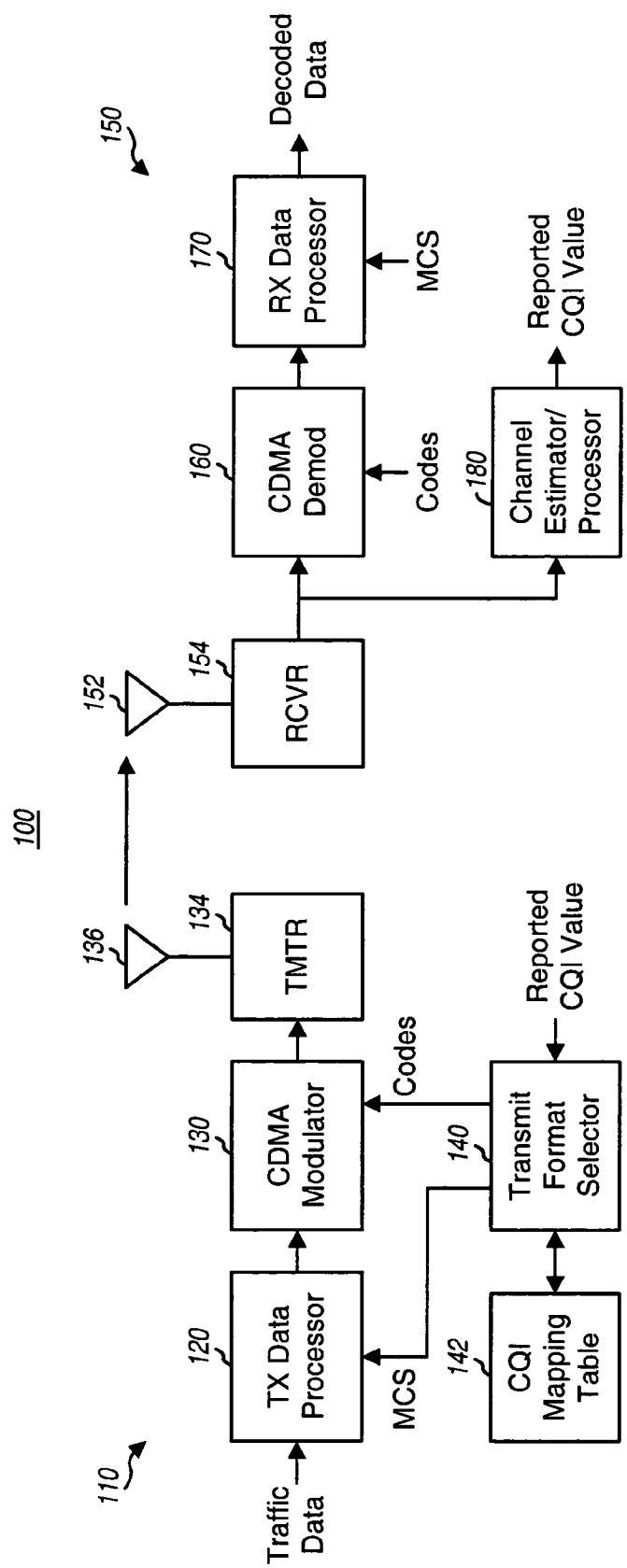
FIG. 1 shows a block diagram of a Node B and a UE in a SISO CDMA system.

The word "exemplary" is used herein to mean "serving as an example, instance, or illustration." Any embodiment described herein as "exemplary" is not necessarily to be construed as preferred or advantageous over other embodiments.

The transmit format selection techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on. A CDMA system utilizes Code Division Multiplexing (CDM) and may implement a radio technology such as Wideband CDMA (W-CDMA), cdma2000, and so on. An OFDMA system utilizes Orthogonal Frequency Division Multiplexing (OFDM). An SC-FDMA system utilizes Single-Carrier Frequency Division Multiplexing (SC-FDM). OFDM and SC-FDM partition the overall system bandwidth into multiple orthogonal subcarriers, which are also referred to as tones, bins, and so on. In general, modulation symbols are sent in the frequency domain with OFDM and in the time domain with SC-FDM.

CDMA, OFDMA and SC-FDMA are different multiple-access schemes that utilize CDM, OFDM and SC-FDM, respectively, to multiplex data for different users and/or streams prior to transmission. CDMA channelizes data with different orthogonal codes and achieves orthogonality in the code domain. OFDMA/SC-FDMA sends data on different subcarriers and achieves orthogonality in the frequency domain.

The total resources available for transmission may be quantified by different parameters in different systems, depending on the multiplexing schemes used by these systems. For example, the total available resources in a CDMA system may be quantified by the number of orthogonal codes and the total transmit power. The total available resources in an OFDMA or SC-FDMA system may be quantified by the number of subcarriers and the total transmit power. A system typically attempts to utilize as much of the total available resources as possible to maximize performance. In general, as channel quality improves, more code or subcarrier resources may be used to improve data throughput.

A single-input single-output (SISO) system employs a single transmit antenna for data transmission to a single receive antenna. A SISO system may control transmission by utilizing all or part of the total available resources. Since the orthogonal codes and subcarriers are orthogonal to one another, all of the available orthogonal codes and subcarriers may be used with little interference among them.

A MIMO system employs multiple (T) transmit antennas for data transmission to multiple (R) receive antennas. A MIMO channel formed by the T transmit antennas and the R receive antennas may be decomposed into S spatial channels, where $S \leq \min\{T, R\}$. The MIMO system has another dimension of resources (spatial dimension) that is orthogonal to the orthogonal codes and subcarriers. Hence, multiple (e.g., S) data streams may be sent simultaneously from the T transmit antennas, where each data stream may be sent in a manner similar to a data stream in a SISO system. In particular, all of the available orthogonal codes or subcarriers may be used for each of the data streams being sent simultaneously.

The data streams sent from the T transmit antennas interfere with one another. A receiver may perform MIMO detection to attempt to separate out these data streams. The MIMO detection is typically not able to completely separate out the data streams, and each data stream observes some interference from the other data streams. The inter-stream interference may be avoided or substantially reduced by using disjoint sets of orthogonal codes or subcarriers for different data streams. For example, T data streams may be sent with T different orthogonal codes (or on T different subcarriers) from the T transmit antennas and would then minimally interfere with one another at the receiver. However, limiting the use of each orthogonal code or each subcarrier to one data stream may substantially reduce system capacity.

Resource reuse refers to the use of a given resource (e.g., an orthogonal code or a subcarrier) for multiple data streams being sent simultaneously. For example, a given orthogonal code may be used for one data stream and then reused for one or more additional data streams. To reduce inter-stream interference, the total available resources may be allocated to the data streams such that each resource (e.g., each orthogonal code or subcarrier) is allocated to as few data streams as possible. The degree of resource reuse indicates the extent in which a given resource is used and reused. The degree of resource reuse may also be referred to as a reuse factor or some other terminology and may be given by an integer or non-integer value. The reuse factor may be low when each data stream needs a small portion of the total available resources and may be high when each data stream needs a larger portion of the total available resources.

In an aspect, transmit format selection is performed in a manner to account for the degrees of resource reuse observed by the data streams. Signal quality at the receiver is affected by the degrees of resource reuse due to inter-stream interference. The signal quality may be estimated based on pilot sent using one reuse factor while data may be sent using a different reuse factor. Hence, the signal quality estimate may not match the actual signal quality observed by the data streams. The techniques described herein account for the difference in the estimated signal quality and the actual signal quality in selecting suitable transmit formats for the data streams.

The techniques described herein may be used for CDMA, OFDMA, SC-FDMA and other systems employing MIMO. For clarity, the techniques are specifically described below for a MIMO CDMA system in which orthogonal codes are the resources being reused. The MIMO CDMA system may implement W-CDMA or cdma2000. The orthogonal codes are referred to as orthogonal variable spreading factor (OVSF) codes in W-CDMA and as Walsh codes in cdma2000. W-CDMA supports High-Speed Downlink Packet Access (HSDPA), which allows for data transmission on 1 to 15 High Speed Physical Downlink Shared Channels (HS-PDSCHs). A different 16-chip OVSF code is used for each HS-PDSCH. cdma2000 supports high-speed packet data transmission on 1 or 2 Forward Packet Data Channels (F-PDCHs) that may be targeted for different users. A different group of one or more (up to 28) 32-chip Walsh codes may be used for each F-PDCH. In general, more data may be sent by using more orthogonal codes since the spreading factor of these codes is fixed.

For clarity, the techniques are specifically described below for downlink transmission for HSDPA in 3GPP. Hence, 3GPP terminology is used in, much of the description below. Data transmission in a SISO CDMA system is described first, followed by data transmission in a MIMO CDMA system.

FIG. 1 shows a block diagram of a Node B 110 and a user equipment (UE) 150 in a SISO CDMA system 100. A Node B may also be referred to as a base station, an access point, and so on. A UE may also be referred to as a mobile station (MS), a user terminal, a wireless device, and so on.

At Node B 110, a transmit (TX) data processor 120 processes (e.g., encodes, interleaves, and symbol maps) traffic data in accordance with a selected MCS and generates data symbols. The selected MCS may indicate a specific data block size, a specific code rate, a specific modulation scheme, and/or other parameters to use for transmission. In general, a data symbol is a modulation symbol for data, a pilot symbol is a modulation symbol for pilot, a modulation symbol is a complex value for a point in a signal constellation (e.g., for PSK or QAM), and a symbol is a complex value. A pilot is data/transmission that is known a priori by both the transmitter and receiver. A CDMA modulator 130 channelizes (or spreads) the data symbols with one or more OVSF codes for one or more HS-PDSCHs to generate data chips and also channelizes pilot symbols with a pilot OVSF code to generate pilot chips. Modulator 130 then sums the data and pilot chips and scrambles the summed chips to generate output chips. A transmitter (TMTR) 134 processes (e.g., converts to analog, amplifies, filters, and frequency upconverts) the output chips and generates a downlink signal, which is transmitted via an antenna 136.

At UE 150, an antenna 152 receives the downlink signal from Node B 110 and provides a received signal to a receiver (RCVR) 154. Receiver 154 conditions (e.g., filters, amplifies, frequency downconverts, and digitizes) the received signal and provides received samples. A CDMA demodulator (Demod) 160 descrambles the received samples, dechannelizes (or despreads) the descrambled samples with the OVSF code(s) used by Node B 110, and provides data symbol estimates. A receive (RX) data processor 170 processes (e.g., symbol demaps, deinterleaves, and decodes) the data symbol estimates in accordance with the selected MCS and provides decoded data. In general, the processing at UE 150 is complementary to the processing at Node B 110.

For transmit format selection, a channel estimator/processor 180 at UE 150 processes the received samples for pilot and provides a channel quality indicator (CQI) value that indicates the received signal quality at UE 150. UE 150 sends the CQI value back to Node B 110. At Node B 110, a transmit format selector 140 receives the reported CQI value and selects a transmit format to use for transmission to UE 150. For HSDPA, the selected transmit format indicates the MCS as well as the number of HS-PDSCHs to use for transmission. A CQI mapping table 142 stores a set of transmit formats supported by the system and the mapping between CQI values and transmit formats.

The transmit format selection may be performed in various manners in a SISO CDMA system. For clarity, a specific embodiment of transmit format selection is described below. In this embodiment, UE 150 estimates the signal-to-noise ratio (SNR) of the received pilot by measuring the received pilot power and the total received power. UE 150 then estimates the SNR of the received data on all HS-PDSCHs used for transmission and derives a reported CQI value, as follows:

Reported $CQI$ value=$(E_{cp}/N_t)+(E_{ct}/E_{cp})+SF+UE\_offset$, Eq (1)

where $E_{cp}/N_t$ is a pilot-chip SNR, which is the SNR per chip for the pilot, $E_{ct}/E_{cp}$ is a traffic-to-pilot power ratio, which is given by higher layer signaling, SF is a spreading gain for the HS-PDSCHs, which is equal to 10 log(16), and UE_offset is a UE-specific design parameter.

All of the quantities in equation (1) are given in units of decibels (dB).

$E_{cp}$ denotes energy per chip for pilot, $E_{ct}$ denotes energy per chip for traffic data, and $N_t$ denotes total noise and interference. For $E_{cp}$ and $E_{ct}$, subscript "c" denotes chip, subscript "t" denotes traffic, and subscript "p" denotes pilot.

The pilot-chip SNR may be derived by processing the received samples for the pilot for all signal paths of interest. SF accounts for the spreading gain of the 16-chip OVSF codes used for the HS-PDSCHs. $E_{ct}/E_{cp}$ accounts for the transmit power used for traffic data relative to the transmit power used for the pilot. UE_offset is a correction factor that accounts for implementation loss at UE and/or other factors. In general, the CQI value may be derived in different manners depending on receiver architecture (e.g., a rake receiver or an equalizer-based receiver), the sample statistics available for SNR calculation, and so on.

Node B 110 receives the reported CQI value and selects a transmit format. Node B 110 may derive a revised CQI value based on the reported CQI value, as follows:

Revised $CQI$ value=Reported $CQI$ value+
Power_offset+Node_$B$_offset, Eq (2)

where Power_offset is a power offset for the HS-PDSCHs, and

Node_B_offset is a Node B-specific design parameter.

All of the quantities in equation (2) are given in units of dB.

Power_offset accounts for possible difference between the transmit $E_{ct}/E_{cp}$ and the signaled $E_{ct}/E_{cp}$ and may be expressed as:

Power_offset=transmit $E_{ct}/E_{cp}$−signaled $E_{ct}/E_{cp}$. Eq (3)

The difference between the transmit $E_{ct}/E_{cp}$ and the signaled $E_{ct}/E_{cp}$ may be due to transmit power shortage at Node B 110 and/or other factors.

Node_B_offset accounts for channel dependent discrepancy between the reported CQI value from UE 150 and the actual SNR. Node_B_offset may be adjusted via a closed-loop mechanism to achieve a target level of performance. For example, Node_B_offset may be adjusted based on ACK/NACK reports, received from UE 150 for packets sent by Node B 110, to achieve a target packet error rate (PER) of 1% or some other value. Node_B_offset may be decreased by $\Delta_{dn}$ for each NACK report and increased by $\Delta_{up}$ for each ACK report, where $\Delta_{up}=\Delta_{dn}\cdot PER/(1-PER)$.

Node B 110 may derive the revised CQI value based on the reported CQI value as shown in equation (2) or in other manners. Node B 110 may also disregard the reported CQI value and derive a CQI value in any manner that the Node B deems fit. In general, Node B 110 may select a transmit format based on various factors such as the reported CQI value, amount of data to send, QoS requirements, available transmit power, and so on.

Table 1 shows an exemplary CQI mapping table that maps CQI values to recommended transmit formats. The CQI mapping table is provided for reference and may be used by UE 150 to compute its UE_offset. The reported CQI value indicates that the signal quality at UE 150 is such that if Node B 110 were to transmit with the associated transmit format in an AWGN channel, a block error rate (BLER) of 10% or less would be achieved.

TABLE 1

| CQI Value | Transport Block Size | Number HS-PDSCHs | Mod Scheme |
|---|---|---|---|
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |

TABLE 1-continued

| CQI Value | Transport Block Size | Number HS-PDSCHs | Mod Scheme |
|---|---|---|---|
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17237 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

Table 1 shows an exemplary CQI mapping table. Other CQI mapping tables may also be defined for use. For a given CQI mapping table, the data rate, modulation order, and number of OVSF codes generally increase for larger CQI values.

Node B 110 has 15 OVSF codes for 15 HS-PDSCHs in HSDPA. The transmit format selected by Node B 110 indicates a specific number of HS-PDSCHs to use for transmission to UE 150. If less than 15 HS-PDSCHs are used for UE 150 (for CQI values of 1 through 26 in Table 1), then Node B 110 may or may not allocate the remaining HS-PDSCHs to other UEs.

Figure 2:
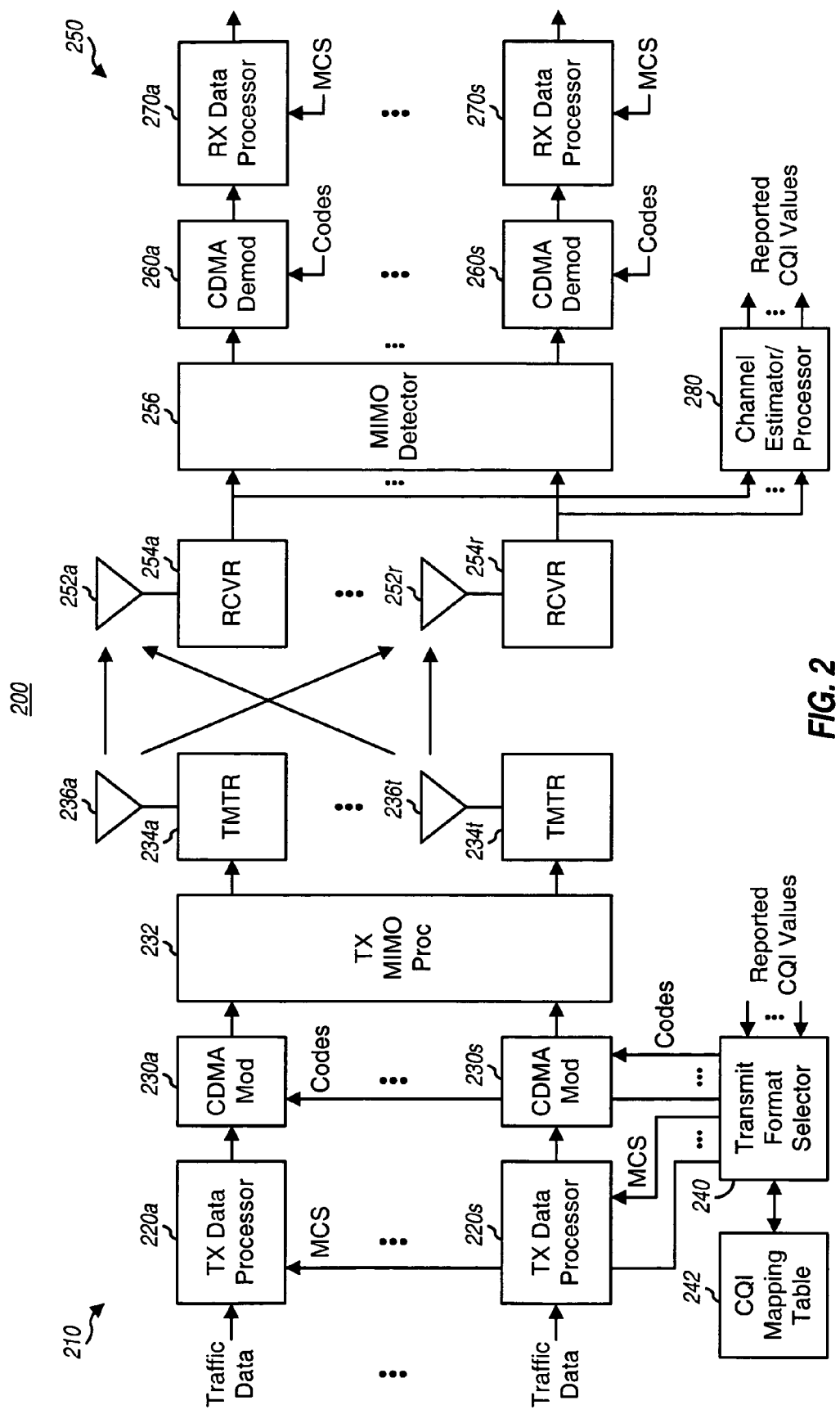
FIG. 2 shows a block diagram of a Node B and a UE in a MIMO CDMA system.

FIG. 2 shows a block diagram of a Node B 210 and a UE 250 in a MIMO CDMA system 200. Node B 210 is equipped with multiple (T) transmit antennas 236a through 236t, and UE 250 is equipped with multiple (R) receive antennas 252a through 252r. For simplicity, the following description assumes a full rank MIMO channel with T≦R. In general, data may be transmitted in various manners with MIMO. For simplicity, much of the following description is for a per antenna rate control (PARC) embodiment in which up to T data streams may be sent simultaneously from the T transmit antennas, and a transmit format may be selected for each data stream.

Node B 210 includes S TX data processors 220a through 220s and S CDMA modulators 230a through 230s for S data streams, where S≦T, a TX MIMO processor 232, and T transmitters 234a through 234t for the T transmit antennas. A transmit format selector 240 selects a transmit format for each data stream, assigns one or more OVSF codes to each data stream, and provides the selected MCS and OVSF code(s) for each stream. For each data stream, TX data processor 220 processes traffic data in accordance with the selected MCS and generates data symbols. CDMA modulator 230 channelizes the data symbols with the assigned OVSF code(s) to generate data chips, channelizes pilot symbols with the pilot OVSF code to generate pilot chips, and sums and scrambles the data and pilot chips to generate output chips.

TX MIMO processor 232 performs transmitter spatial processing on the S output chip streams from CDMA modulators 230a through 230s and provides T transmit chip streams to T transmitters 234a through 234t. In an embodiment, S=T, and TX MIMO processor 232 simply provides each output chip stream to a respective transmitter 234. In another embodiment, TX MIMO processor 232 multiplies the S output chip streams with orthonormal matrices, precoding matrices, or some other matrices to send each output chip stream from multiple (e.g., all T) transmit antennas. In any case, each transmitter 234 processes a respective transmit chip stream and generates a downlink signal. T downlink signals generated by transmitters 234a through 234t are transmitted via antennas 236a through 236t, respectively.

UE 250 includes R receivers 254a through 254r for the R receive antennas, a MIMO detector 256, and S CDMA demodulators 260a through 260s and S RX data processors 270a through 270s for the S data streams. R antennas 252a through 252r receive the downlink signals from Node B 210 and provides R received signals to receivers 254a through 254r, respectively. Each receiver 254 conditions its received signal and provides received samples. MIMO detector 256 obtains the received samples from all R receivers 254, performs MIMO detection on the received samples to separate out the S data streams, and provides detected samples for the S streams. For each data stream, CDMA demodulator 260 descrambles the detected samples for that stream, dechannelizes the descrambled samples with the OVSF code(s) used for that stream, and provides data symbol estimates. RX data processor 170 processes the data symbol estimates in accordance with the selected MCS and provides decoded data for the stream.

For transmit format selection, a channel estimator/processor 280 at UE 250 processes the received samples for pilot and provides CQI values for the S data streams. UE 250 sends the CQI values back to Node B 210. At Node B 210, transmit format selector 240 receives the reported CQI values and selects a transmit format for each data stream, as described below. CQI mapping table 242 stores the supported transmit formats and the mapping between CQI values and transmit formats.

Node B 210 may transmit pilots in a manner to allow UE 250 to characterize the MIMO channel and generate S CQI values for the S data streams. In an embodiment, Node B 210 generates T orthogonal pilots with T pilot OVSF codes and transmits these T orthogonal pilots from the T transmit antennas. In another embodiment, Node B 210 generates S orthogonal pilots with S pilot OVSF codes and multiplexes (e.g., combines) these orthogonal pilots with the channelized traffic data prior to the transmitter spatial processing. In general, UE 250 may derive SNR estimates in different manners depending on the manner in which pilots are sent by Node B 210, the transmitter spatial processing (if any) performed by Node B 210, and the MIMO detection performed by UE 250.

The following description assumes that Node B 210 transmits T orthogonal pilots from the T transmit antennas. UE 250 may estimate the pilot-chip SNR of each transmit antenna based on the received pilot. UE 250 may then determine the traffic-symbol SNR per data stream based on the pilot-chip SNRs and then derive the CQI value for each data stream based on the traffic-symbol SNR.

The received samples at UE 250 in each chip period k may be expressed as:

$$\underline{y}(k) = \underline{H}(k) \cdot \underline{p}(k) + \underline{H}(k) \cdot \underline{x}(k) + \underline{n}(k), \qquad \text{Eq (4)}$$
$$= \underline{h}_1(k) \cdot p_1(k) + \underline{h}_2(k) \cdot p_2(k) + \ldots + \underline{h}_T(k) \cdot p_T(k) +$$
$$\underline{h}_1(k) \cdot x_1(k) + \underline{h}_2(k) \cdot x_2(k) + \ldots + \underline{h}_T(k) \cdot x_T(k) + \underline{n}(k),$$

where $y(k)=[y_1(k)\ y_2(k)\ \ldots\ y_R(k)]^T$ is an R×1 vector of received samples, $H(k)=[h_1(k)\ h_2(k)\ \ldots\ h_T(k)]$ is an R×T MIMO channel response matrix, $p(k)=[p_1(k)\ p_2(k)\ \ldots\ p^T(k)]^T$ is a T×1 vector of transmitted pilot chips, $x(k)=[x_1(k)\ x_2(k)\ \ldots\ x^T(k)]^T$ is a T×1 vector of transmitted data chips, n(k) is an R×1 noise vector at the UE, and "$T$" denotes a transpose.

UE 250 may estimate the channel response vector $h_i(k)$ for each transmit antenna i, for i=1, . . . , T, as follows. UE 250 first despreads the received sample vectors y(k) for different chip periods with the pilot OVSF code $p_i(k)$ for transmit antenna i. UE 250 then accumulates the despread vectors over the pilot OVSF code length to obtain a pilot estimate $h'_i$ having the data, signaling, and pilot sent with other OVSF codes removed. UE 250 may filter or average the pilot estimates across multiple pilot symbol periods to obtain an estimate of $h_i$. The pilot OVSF code length should be an integer multiple of all OVSF codes used for data and signaling in order to accurately estimate the MIMO channel response. For 3GPP, the pilot OVSF code length is 256 chips, and the HS-PDSCH OVSF code length is 16 chips. For simplicity, the following description assumes no channel estimation errors.

UE 250 may also estimate an R×R background noise covariance matrix $R_{nn}$ as follows. UE 250 may first despread and accumulate the received sample vectors y(k) in each pilot symbol period to obtain a noisy pilot vector. UE 250 may then subtract the pilot estimates for all T transmit antennas from the noisy pilot vector to obtain a noise vector. UE 250 may compute an outer product of the noise vector and average the outer product across multiple pilot symbol periods to obtain an estimate of $R_{nn}$. Alternatively, the background noise may be assumed to be spatio-temporally white, so that $R_{nn}=\sigma_n^2 \cdot I$, where $\sigma_n^2$ is the noise variance and I is an identity matrix. The noise variance may be estimated based on an estimate of the total received energy and an estimate of the signal and interference energy.

UE 250 may perform MIMO detection (or equalization) based on various techniques such as a linear minimum mean square error (MMSE) technique, a zero-forcing (ZF) technique, an MRC technique, a successive interference cancellation (SIC) technique, and so on, all of which are known in the art. For clarity, the following description assumes that UE 250 uses the linear MMSE technique.

UE 250 may derive a spatial filter matrix based on the linear MMSE technique, as follows:

$$M(k)=D(k)\cdot[H^H(k)\cdot H(k)+R_{nn}(k)]^{-1}\cdot H^H(k), \quad \text{Eq (5)}$$

where M(k) is a T×R spatial filter matrix, $D(k)=[\text{diag}\{[H^H(k)\cdot H(k)+R_{nn}(k)]^{-1}\cdot H^H(k)\cdot H(k)\}]^{-1}$, and "$H$" denotes a conjugate transpose.

UE 250 may perform detection on the received samples, as follows:

$$\hat{x}(k)=M(k)\cdot y(k)=x(k)+\tilde{n}(k), \quad \text{Eq (6)}$$

where $\hat{x}(k)$ is a T×1 vector of detected samples, and $\tilde{n}(k)$ is the noise after the linear MMSE detection.

The SNR of the detected samples from the linear MMSE detection for each data stream i may be expressed as:

$$(E_{ct}/N_t)_i=(E_{ct})_i\cdot h_i^H\cdot \Psi_i^{-1}\cdot h_i, \quad \text{Eq (7)}$$

where $\Psi_i$ is an R×R interference and noise covariance matrix for data stream i, $(E_{ct})_i$ is the total chip energy of the traffic data sent on data stream i, $(E_{ct}/N_t)_i$ is the traffic-chip SNR for data stream i, and $h_i$ is an averaged channel response estimate for data stream i.

The interference and noise covariance matrix for each data stream i may be expressed as:

$$\Psi_i = R_{nn} + \sum_{j=1, j\neq i}^{T} (E_{ct})_j \cdot h_j \cdot h_j^H. \quad \text{Eq (8)}$$

In equation (8), $R_{nn}$ represents the background noise, and the summation term represents inter-stream interference from other data streams.

The total chip energy of the traffic data sent on data stream i may be expressed as:

$$(E_{ct})_i=(E_{cp})_i\cdot(E_{ct}/E_{cp})_i, \quad \text{Eq (9)}$$

where $(E_{cp})_i$ is the chip energy of the pilot, and $(E_{ct}/E_{cp})_i$ is the traffic-to-pilot power ratio for data stream i. In general, the same or different traffic-to-pilot power ratios may be used for the S data streams. The traffic-to-pilot power ratios or other pertinent information may be signaled to UE 250, e.g., as semi-static parameters.

UE 250 may derive the CQI value for each data stream i, as follows:

$$(\text{Reported } CQI \text{ value})_i=(E_{ct}/N_t)_i+SF+UE\_\text{offset}. \quad \text{Eq (10)}$$

The reported CQI value for each data stream i represents the total traffic-symbol SNR summed across all HS-PDSCHs used for data stream i. In general, the CQI value may be derived in different manners depending on the MIMO detection technique used by UE 250, the sample statistics available for SNR calculation, and so on.

UE 250 may send S reported CQI values for the S data streams to Node B 210. Node B 210 may then derive S revised CQI values based on the reported CQI values, as described above. Node B 210 may select a transmit format for each data stream based on the revised CQI value for that data stream, as also described above. As shown in Table 1, different numbers of OVSF codes ranging from 1 to 15 may be used for different transmit formats.

In general, the same or different sets of OVSF codes may be used for the S data streams. Each set may include any number of OVSF codes depending on the transmit format selected for use. To minimize inter-stream interference, Node B 210 may assign different OVSF codes to different data streams until all of the available OVSF codes are assigned. If the total number of required OVSF codes is equal to or less than the number of available OVSF codes, then S disjoint sets of OVSF codes may be used for the S data streams, and inter-stream interference may be avoided. Node B 210 may reuse the available OVSF codes as more OVSF codes are required. A smaller degree of code reuse may reduce inter-stream interference and improve performance.

UE 250 typically does not have information regarding the transmit formats selected by Node B 210 or the code assignment for an upcoming scheduling interval. UE 250 may then derive the CQI values based on an assumption that all OVSF codes are used for each of the data streams, as shown in equation (8). If the data streams use disjoint sets of OVSF codes, then the inter-stream interference term in equation (8) would disappear after despreading, and a higher CQI value may be obtained for each data stream.

If UE 250 has information regarding the code assignment and the power allocation for the next scheduling interval, then UE 250 may be able to generate a more accurate interference and noise covariance matrix, as follows:

$$\Psi_i = R_{nn} + \sum_{\substack{j=1 \\ j \neq i}}^{T} \sum_{l=1}^{L} (E_{ct})_{j,l} \cdot h_j \cdot h_j^H \cdot I(l \in C_i) \cdot I(l \in C_j), \quad \text{Eq (11)}$$

where $(E_{ct})_{i,l}$ is the chip energy for OVSF code l used for data stream i, $I(l \in C_j)$ is an indicator function for data streams j, L is the number of OVSF codes available for use, e.g., L=15 for HSDPA, and $\tilde{\Psi}_i$ is an improved interference and noise covariance matrix for data stream i.

The indicator function may be defined as:

$$I(l \in C_j) = \begin{cases} 1 & \text{for } l \in C_j \\ 0 & \text{for } l \notin C_j, \end{cases} \quad \text{Eq (12)}$$

where $C_j$ represents the set of OVSF codes used for data stream j in the scheduling interval of interest. The indicator function is set to 1 for all OVSF codes used for data stream j and is set to 0 for the remaining OVSF codes.

If the transmit power for each data stream is distributed uniformly across all OVSF codes used for that data stream, then the transmit power for each OVSF code may be expressed as:

$$(E_{ct})_{j,l} = \frac{(E_{ct})_j \cdot I(l \in C_j)}{L_j}, \quad \text{Eq (13)}$$

where $L_j$ is the number of OVSF codes used for data stream j.

In equation (11), the covariance matrix $\Psi_i$ for data stream i includes interference from other data streams only for OVSF codes that are common (or reused) with the OVSF codes for data stream i. Furthermore, the interference from each OVSF code of each data stream is scaled by the transmit power $(E_{ct})_{i,l}$ used for that OVSF code. Hence, the interference estimate in equation (11) is more accurate than the interference estimate in equation (8). The covariance matrix $\Psi_i$ may also be derived to include interference from other OVSF codes (if any) that are non-orthogonal to the OVSF codes for data stream i. Furthermore, the covariance matrix may also be derived by taking into account the despreading effect in the CDMA system in advance, where the inter-stream interference component that uses the same code as a desired signal component obtains a despreading energy gain of SF relative to the background noise or multipath interference component.

The SNR of the detected samples for each data stream i may then be expressed as:

$$(E_{ct}/N_t)_i = (E_{ct})_i \cdot h_i^H \cdot \tilde{\Psi}_i^{-1} \cdot h_i. \quad \text{Eq (14)}$$

UE 250 typically does not have information on the degree of code reuse or the code assignment for each data stream. This information is not available until Node B 210 selects the transmit formats for the S data streams and assigns a set of OVSF code(s) to each data stream. The degree of code reuse may significantly affect the SNR estimate, e.g., in scenarios with high geometry and short delay spread. Hence, the transmit formats selected based on the reported CQI values may not match well with the actual channel quality observed by the data streams in the next scheduling interval.

A reuse correction factor may be used to account for discrepancy between the reported CQI values (which may assume full reuse of the available OVSF codes for each of the data streams) and the actual SNR for a given degree of code reuse. In an embodiment, Node B 210 derives revised CQI values based on the reported CQI values, as follows:

(Revised CQI value)$_i$ = (Reported CQI value)$_i$ +     Eq (15)

(Power_offset)$_i$ +

(Reuse_correction_factor)$_i$ +

Node_B_offset, where (Reuse_correction_factor)$_i$ is a reuse correction factor for data stream i, and (Revised CQI value)$_i$ is a revised CQI value for data stream i.

In general, the reuse correction factor may be determined based on any function of any set of one or more pertinent parameters. These parameters should be available at Node B 210. One such parameter is the reported CQI values. Another such parameter is the interference observed by each data stream i, which may be estimated as follows:

$$(\text{Interference})_i = \frac{1}{(E_{ct})_i} \cdot \sum_{\substack{j=1 \\ j \neq i}}^{T} \sum_{l=1}^{L} (E_{ct})_{j,l} \cdot \quad \text{Eq (16)}$$

$$I(l \in C_i) \cdot I(l \in C_j),$$

where (Interference)$_i$ is an interference estimate for data stream i. In equation (16), the interference is estimated based on the summed power for OVSF codes for other data stream streams that are the same as the OVSF codes for data stream i. Node B 210 may derive the interference estimate in equation (16) since all of the quantities are available at the Node B.

In an embodiment, the reuse correction factor for each data stream i is defined based on a function $f$ of the interference estimate and the reported CQI value for data stream i, and possibly other parameters, as follows:

(Reuse_correction_factor)$_i$ = $f$ {(Interference)$_i$, (Reported CQI value)$_i$, ...}.     Eq (17)

Function $f$ may be determined based on computer simulation, empirical measurements, and so on. Function $f$ may also be stored in a look-up table that may be indexed by appropriate inputs.

In another embodiment, the degree of code reuse is determined for each data stream i based on a function g of the interference estimate for data stream i, as follows:

(Degree_code_reuse)$_i$ = $g$ {(Interference)$_i$},     Eq (18)

where (Degree_code_reuse)$_i$ is the degree of code reuse for data stream i. Function g may be a monotonic function of interference and may be determined based on computer simulation, empirical measurements, and so on.

The reuse correction factor for each data stream i may then be determined based on the degree of code reuse for data stream i. In one embodiment, the reuse correction factor is set to an offset value Δ if the degree of code reuse is below a threshold value and is set to zero otherwise, as follows:

$$(\text{Reuse\_correction\_factor})_i = \begin{cases} \Delta & \text{if}(\text{Degree\_code\_reuse})_i < \text{Threshold} \\ 0 & \text{otherwise.} \end{cases} \quad \text{Eq (19)}$$

In another embodiment, multiple threshold values and multiple offset values are used for comparison. The degree of code reuse is compared against the threshold values, and the reuse correction factor is set to one of the offset values based on the results of the comparison.

In yet another embodiment, the threshold value and/or the offset value in equation (19) are adjusted via a closed-loop mechanism to achieve the desired level of performance, e.g., a target PER of 1%. The offset value $\Delta$ may be adjusted based on ACK/NACK reports corresponding to packets whose degree of code reuse is smaller than the threshold value. Node_B_offset may still be adaptively adjusted based on ACK/NACK reports of either all packets or packets whose degree of code reuse is greater than or equal to the threshold.

The description above assumes that UE 250 derives the CQI values with full reuse of the available OVSF codes for all data streams, as shown in equation (8). This results in pessimistic reported CQI values. Node B 210 may then use non-negative reuse correction factors to account for the pessimistic reported CQI values.

UE 250 may derive the CQI values by assuming no reuse of the available OVSF codes among all of the data streams, e.g., by omitting the summation term in equation (8). This would then result in optimistic reported CQI values. In this case, Node B 210 may use non-positive reuse correction factors to account for the optimistic reported CQI values. A non-positive reuse correction factor may be set to a maximum value of 0 dB when there is no reuse of the OVSF codes among the data streams in a given scheduling interval. As the degree of code reuse increases, Node B 210 may add more backoff with a more negative reuse correction factor. Alternatively, Node_B_offset may be designed or adapted so that the reuse correction factor is a non-negative function even when UE 250 assumes no code reuse.

In the description above, the interference estimates are derived based on an initial code assignment for the data streams. This initial code assignment may be the code assignment used in the last scheduling interval, a code assignment based on transmit formats selected without considering code reuse, and so on. The interference estimates are used to select transmit formats for the data streams, and a new code assignment is obtained based on the selected transmit formats. If the new code assignment is different from the initial code assignment, then the interference estimates derived earlier may not be accurate. In general, any number of iterations of interference estimation, transmit format selection, and code assignment may be performed until the desired accuracy is achieved, e.g., until the code assignment at the start of the iteration is the same as the code assignment at the end of the iteration.

Figure 3:
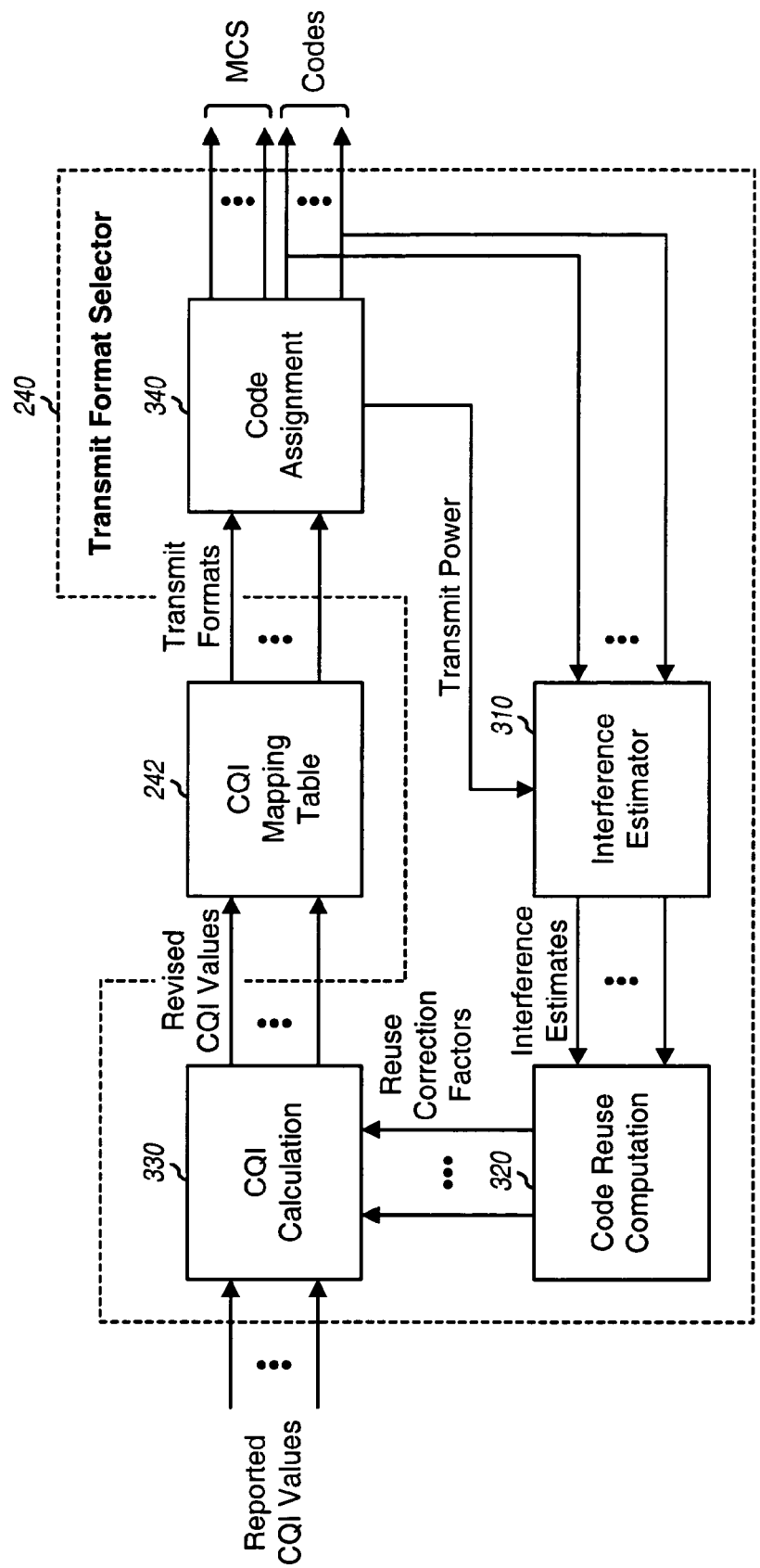
FIG. 3 shows a block diagram of a transmit format selector.

FIG. 3 shows a block diagram of an embodiment of transmit format selector 240 in FIG. 2. Within selector 240, an interference estimator 310 receives the initial code assignment and the transmit power for the data streams and derives interference estimates for these data streams, e.g., as shown in equation (16). A computation unit 320 may derive a reuse correction factor for each data stream i based on the interference estimate for that stream, e.g., as shown in equations (18) and (19). Computation unit 320 may also derive the reuse correction factors for the S data streams based on the interference estimates, the reported CQI values, and/or other information, as shown in equation (17).

A CQI calculation unit 330 derives revised CQI values based on the reported CQI values, the reuse correction factors, and the power offsets for the data streams and Node_B_offset, e.g., as shown in equation (15). CQI mapping table 242 receives the revised CQI values for the data streams and provides transmit formats for these streams. A code assignment unit 340 determines the number of OVSF codes to assign to each data stream based on its transmit format and assigns a set of one or more OVSF codes to each data stream. If the new code assignment does not match the initial code assignment, then another iteration of interference estimation, transmit format selection, and code assignment may be performed. After all iterations, unit 340 provides the MCS and the assigned OVSF code(s) for each data stream.

In an embodiment, the interference estimate, degree of code reuse, and reuse correction factor are derived for each data stream, as described above. In another embodiment, the data streams are sent such that they observe similar interference, so that a single degree of code reuse and a single reuse correction factor may be derived for all S data streams. For example, the data streams may be assigned OVSF codes that vary over time based on a predetermined or pseudo-random permutation. The code assignment may change every symbol period or every multiple symbol interval within a frame and may be such that all data streams have similar degrees of code reuse and observe similar interference.

In another embodiment, the data streams are transmitted such that they observe similar received signal quality and similar degrees of resource reuse. Each data stream may be sent from all T transmit antennas based on a predetermined or pseudo-random permutation, e.g., using an orthonormal matrix that maps each data stream to all T transmit antennas. The data streams may also be sent such that they observe similar degrees of code reuse and similar interference, as described above. In this case, a common transmit format may be used for all data streams, which may reduce both signaling for CQI reporting and signaling for the selected transmit format. A single control channel (e.g., a common HS-SCCH) may be used for all data streams instead of a separate control channel for each data stream.

In another embodiment, a power offset is applied to each data stream based on the degree of code reuse observed by that stream. The power offset for each data stream may be a function of the interference observed by the data stream, e.g., a larger power offset may be used for more interference, and vice versa. Node B 210 may select a transmit format for each data stream in the normal manner without using a reuse correction factor. Node B 210 may then adjust the transmit power of each data stream based on the power offset for that stream.

In yet another embodiment, code assignment is performed based on one or more system goals. Node B 210 may select a transmit format for each data stream in the normal manner without using a reuse correction factor. Node B 210 may then assign OVSF codes such that data streams with high data rates (or large CQI values) have as low degrees of code reuse as possible. This may reduce the likelihood of transmission errors for the high-rate data streams, which may be desirable since a transmission error may require retransmission of a larger amount of data for a high-rate data stream. Data streams with low data rates may observe higher degrees of code reuse, which may be tolerable since smaller amounts of data may be retransmitted for transmission errors on these lower-rate streams. Different code assignment schemes may be defined for different system goals relating to throughput, QoS requirements, priority, and so on.

For clarity, the transmit format selection techniques have been specifically described with OVSF codes being the resources that are reused. The techniques may also be applied for other types of resources. For example, the techniques may be used for MIMO OFDM systems, MIMO OFDMA systems, and MIMO SC-FDMA systems in which subcarriers are the resources that may be reused. A UE may derive CQI values for different data streams based on received pilots. Since the UE does not have information on subcarrier reuse in the next scheduling interval, the UE may derive the CQI values assuming all (or none) of the subcarriers are reused for the data streams. The Node B may reuse only some of the subcarriers in the next scheduling interval. For example, power water-filling may be performed for each data stream and only subcarriers with good signal quality may be used for transmission. If different data streams observe different degrees of subcarrier reuse, then the Node B may select a transmit format for each data stream by considering the degree of subcarrier reuse for that steam.

The techniques described herein may result in more accurate transmit format selection so that data may be sent at rates that are closer to the capacity of the wireless channel. The techniques may improve system throughput, maintain residual packet error rate closer to a target error rate, and/or provide other benefits.

Figure 4:
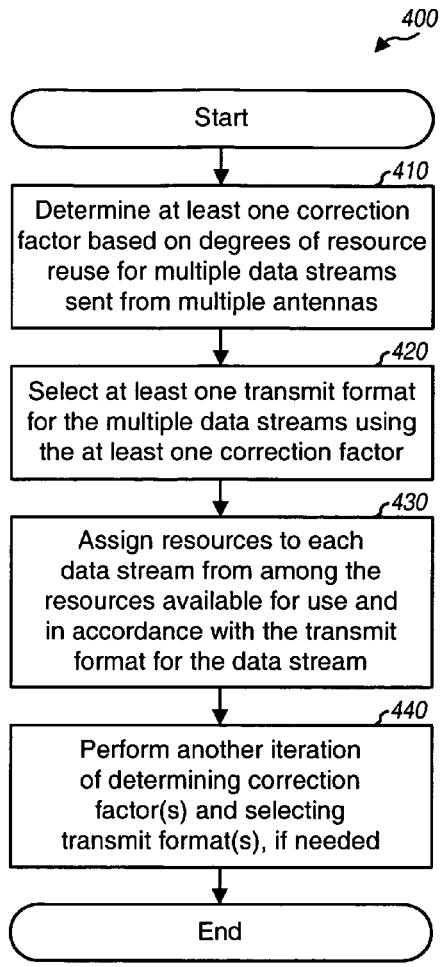
FIGS. 4 and 5 show a process for selecting transmit formats in a MIMO system.

FIG. 4 shows an embodiment of a process 400 for selecting transmit formats for a MIMO transmission. At least one correction factor is determined based on degrees of resource reuse for multiple data streams sent from multiple antennas (block 410). The degree of resource reuse for each data stream is indicative of the amount of reuse of resources observed by that stream. The data streams may have the same or different degrees of resource reuse, depending on the manner in which the data streams are transmitted and the resource assignment. At least one transmit format is selected for the multiple data streams using the at least one correction factor (block 420). Each data stream is associated with a transmit format that indicates the amount of resources to use for that data stream. The transmit format may also indicate other parameters such as a coding and modulation scheme, a block size, and so on. Resources are assigned to each data stream from among the total resources available for use and in accordance with the transmit format for the data stream (block 430). The available resources may be orthogonal codes, subcarriers, and so on. Another iteration of determining correction factor(s) in block 410 and selecting transmit format(s) in block 420 may be performed, if needed (block 440). This additional iteration may be performed if the new resource assignment from block 430 is different from the initial resource assignment used to determine the correction factor(s) in block 410.

Figure 5:
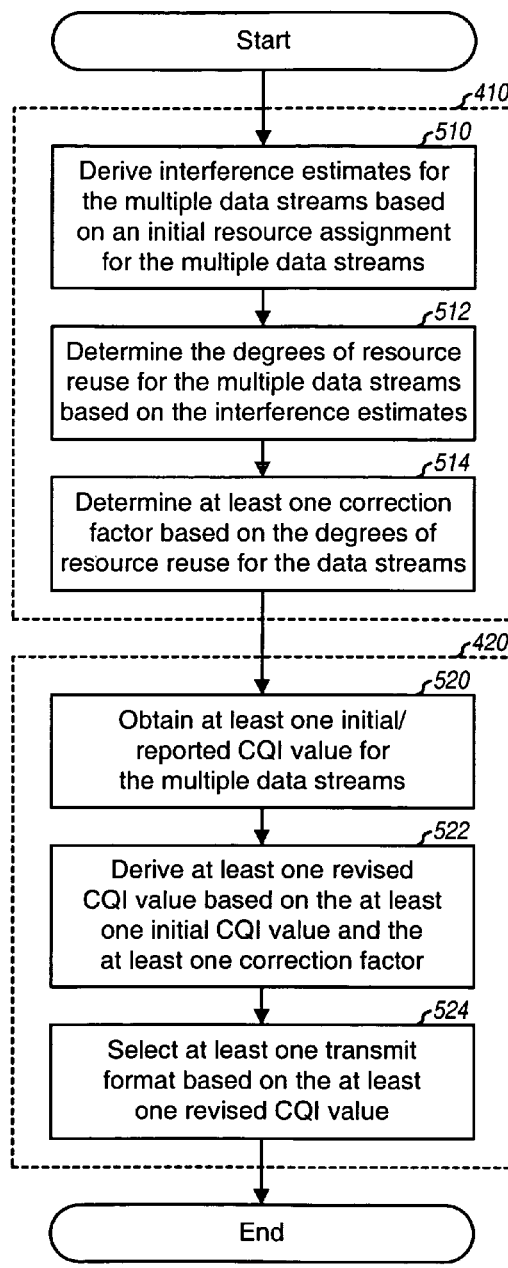

FIG. 5 shows an embodiment of blocks 410 and 420 in FIG. 4. For block 410, interference estimates are derived for the multiple data streams based on an initial resource assignment for the multiple data streams (block 510). The degrees of resource reuse for the multiple data streams are determined based on the interference estimates (block 512). At least one correction factor is determined based on the degrees of resource reuse for the multiple data streams (block 514).

For block 420, at least one initial/reported CQI value is obtained for the multiple data streams (block 520). The initial CQI value(s) may be derived based on an assumption of equal (e.g., highest or lowest) degree of resource reuse for the data streams. At least one revised CQI value is derived based on the at least one initial CQI value and the at least one correction factor (block 522). At least one transmit format is then selected based on the at least one revised CQI value (block 524).

For independent transmit format selection per stream, an interference estimate, a correction factor, an initial CQI value, a revised CQI value, and a transmit format may be obtained for each data stream. Alternatively, a common interference estimate, a common correction factor, a common initial CQI value, a common revised CQI value, and a common transmit format may be obtained for all data streams, e.g., if these data streams are sent such that they observe similar channel conditions and degrees of resource reuse.

Figure 6:
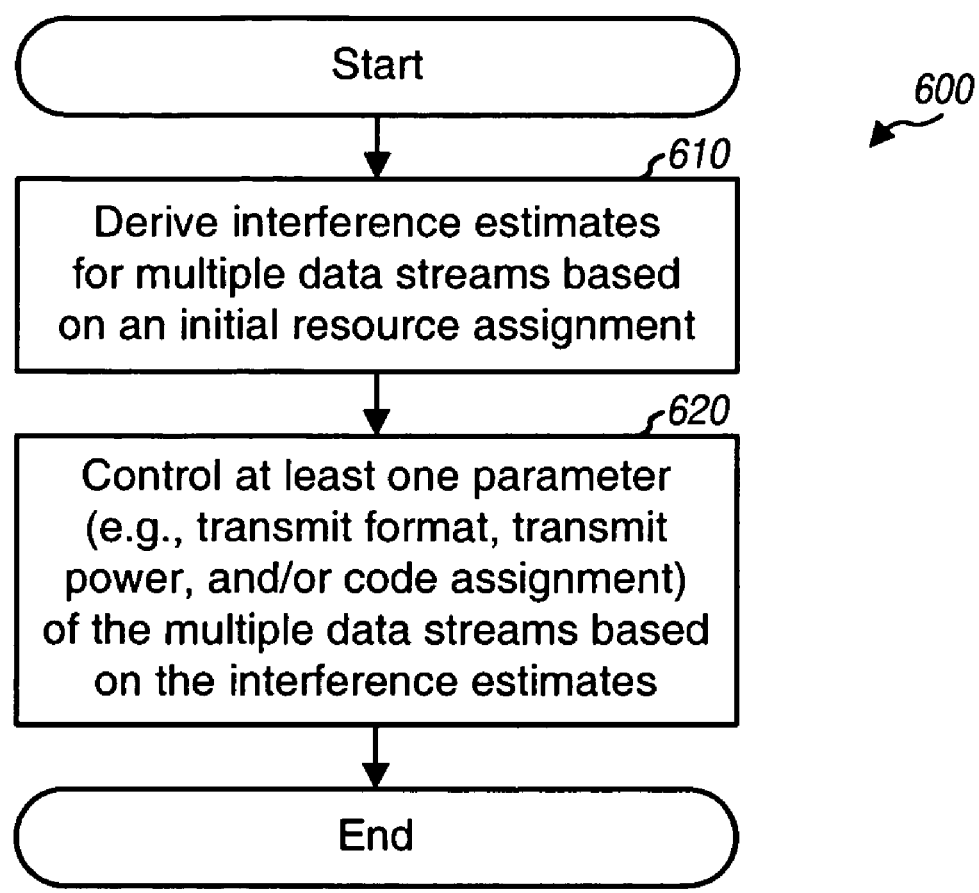
FIG. 6 shows a process for transmitting data in a MIMO system.

FIG. 6 shows an embodiment of a process 600 for transmitting data in a MIMO system. Interference estimates are derived for multiple data streams based on an initial resource assignment (block 610). The multiple data streams are sent simultaneously from multiple antennas, and the interference estimates are for inter-stream interference. At least one parameter of the multiple data streams is controlled based on the interference estimates (block 620). Block 620 may entail (1) selecting at least one transmit format for the multiple data streams based on the interference estimates, (2) adjusting transmit power of the multiple data streams based on the interference estimates, (3) assigning resources (e.g., orthogonal codes or subcarriers) to the multiple data streams based on the interference estimates, and/or (4) controlling some other parameter.

Figure 7:
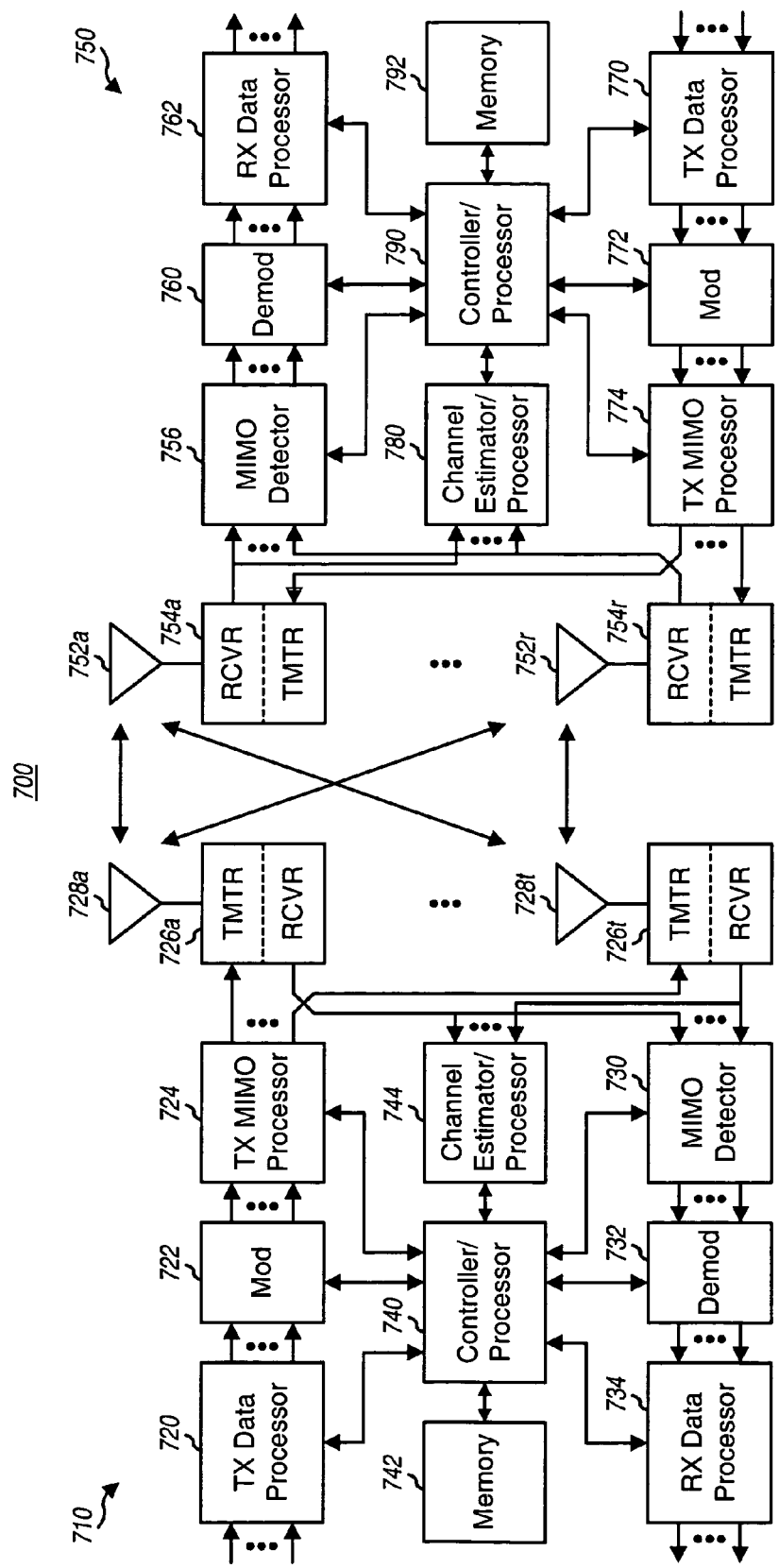
FIG. 7 shows a block diagram of a base station and a terminal in a MIMO system.

FIG. 7 shows a block diagram of an embodiment of a base station 710 and a terminal 750 in a MIMO system 700. For downlink transmission, at base station 710, a TX data processor 720, a modulator 722, a TX MIMO processor 724, and transmitters 726a through 726t process traffic data for multiple data streams, pilot, and signaling, e.g., as described above for Node B 210 in FIG. 2. Modulator 722 may perform processing for CDMA, OFDMA, SC-FDMA, and/or some other multiplexing scheme. The resources allocated to the data streams may be orthogonal codes, subcarriers, and/or some other resources depending on the multiplexing scheme(s) selected for use. At terminal 750, receivers 754a through 754r, a MIMO detector 756, a demodulator 760, and an RX data processor 762 process the signals transmitted by base station 710, e.g., as described above for UE 250 in FIG. 2. Demodulator 760 performs processing complementary to the processing performed by modulator 722.

For uplink transmission, at terminal 750, a TX data processor 770, a modulator 772, a TX MIMO processor 774, and transmitters 754a through 754r process traffic data for one or more data streams, pilot, and signaling (e.g., CQI reports). At base station 710, receivers 726a through 726t, a MIMO detector 730, a demodulator 732, and an RX data processor 734 process the signals transmitted by terminal 750.

For transmit format selection for downlink transmission, at terminal 750, a channel estimator/processor 780 may estimate the downlink signal quality and generate CQI reports. Base station 710 may receive the CQI reports from terminal 750 and select the transmit formats for the data streams sent to terminal 750. For transmit format selection for uplink transmission, at base station 710, a channel estimator/processor 744 may estimate the uplink signal quality and generate CQI reports. Base station 710 may select the transmit formats for the data streams to be sent by terminal 710.

Controllers/processors 740 and 790 control the operation at base station 710 and terminal 750, respectively. Memories 742 and 792 store data and program codes for base station 710 and terminal 750, respectively. Controller/processor 740 may implement transmit format selector 240 in FIG. 3, processes 400 and 600 in FIGS. 4 and 6, and/or other processes for transmit format selection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
at least one processor configured to determine degrees of resource reuse for multiple data streams sent from multiple antennas based on an initial resource assignment, to determine at least one correction factor based on the degrees of resource reuse for the multiple data streams, and to select at least one transmit format for the multiple data streams using the at least one correction factor; and
a memory coupled to the at least one processor.

2. The apparatus of claim 1, wherein the at least one processor derives interference estimates for the multiple data streams and determines the degrees of resource reuse for the multiple data streams based on the interference estimates.

3. The apparatus of claim 1, wherein the at least one processor obtains at least one initial channel quality indicator (CQI) value for the multiple data streams, derives at least one revised CQI value based on the at least one initial CQI value and the at least one correction factor, and selects the at least one transmit format based on the at least one revised CQI value.

4. The apparatus of claim 3, wherein the at least one initial CQI value is derived based on an assumption of similar degrees of resource reuse for the multiple data streams.

5. The apparatus of claim 3, wherein the at least one initial CQI value is derived based on an assumption of highest degree of resource reuse for each of the multiple data streams.

6. The apparatus of claim 3, wherein the at least one initial CQI value is derived based on an assumption of the lowest degree of resource reuse for each of the multiple data streams.

7. The apparatus of claim 1, wherein the at least one processor determines degree of resource reuse for each of the multiple data streams, determines a correction factor for each data stream based on the degree of resource reuse for the data stream, and selects a transmit format for each data stream using the correction factor for the data stream.

8. The apparatus of claim 1, wherein the at least one processor determines a single correction factor for the multiple data streams based on the degrees of resource reuse for the data streams, and selects a single transmit format for the multiple data streams using the single correction factor.

9. The apparatus of claim 1, wherein each data stream is associated with a transmit format that indicates an amount of resources to allocate to the data stream, and wherein the at least one processor assigns resources to each data stream from among resources available for use and in accordance with the transmit format for the data stream.

10. The apparatus of claim 9, wherein the resources available for use are orthogonal codes.

11. The apparatus of claim 9, wherein the resources available for use are subcarriers.

12. The apparatus of claim 1, wherein the at least one processor determines a new resource assignment based on the at least one transmit format, and performs another iteration of determining the degrees of resource reuse, determining at least one correction factor, and selecting at least one transmit format if the new resource assignment is different from the initial resource assignment.

13. A method comprising:
determining degrees of resource reuse for multiple data streams sent from multiple antennas based on an initial resource assignment;
determining at least one correction factor based on the degrees of resource reuse for the multiple data streams; and
selecting at least one transmit format for the multiple data streams using the at least one correction factor.

14. The method of claim 13, further comprising:
deriving interference estimates for the multiple data streams; and
determining the degrees of resource reuse for the multiple data streams based on the interference estimates.

15. The method of claim 13, wherein the selecting the at least one transmit format comprises
obtaining at least one initial channel quality indicator (CQI) value for the multiple data streams,
deriving at least one revised CQI value based on the at least one initial CQI value and the at least one correction factor, and
selecting the at least one transmit format based on the at least one revised CQI value.

16. The method of claim 13, further comprising:
determining a new resource assignment based on the at least one transmit format; and
performing another iteration of determining the degrees of resource reuse, determining the at least one correction factor, and selecting the at least one transmit format if the new resource assignment is different from the initial resource assignment.

17. An apparatus comprising:
means for determining degrees of resource reuse for multiple data streams sent from multiple antennas based on an initial resource assignment;
means for determining at least one correction factor based on the degrees of resource reuse for the multiple data streams; and
means for selecting at least one transmit format for the multiple data streams using the at least one correction factor.

18. The apparatus of claim 17, further comprising:
means for deriving interference estimates for the multiple data streams; and
means for determining the degrees of resource reuse for the multiple data streams based on the interference estimates.

19. The apparatus of claim 17, wherein the means for selecting the at least one transmit format comprises
means for obtaining at least one initial channel quality indicator (CQI) value for the multiple data streams,
means for deriving at least one revised CQI value based on the at least one initial CQI value and the at least one correction factor, and
means for selecting the at least one transmit format based on the at least one revised CQI value.

20. The apparatus of claim 17, further comprising:
means for determining a new resource assignment based on the at least one transmit format; and
means for performing another iteration of determining the degrees of resource reuse, determining the at least one correction factor, and selecting the at least one transmit format if the new resource assignment is different from the initial resource assignment.

21. A non-transitory processor readable media for storing instructions operable to:
determine degrees of resource reuse for multiple data streams sent from multiple antennas based on an initial resource assignment;
determine at least one correction factor based on the degrees of resource reuse for the multiple data streams; and
select at least one transmit format for the multiple data streams using the at least one correction factor.

22. The non-transitory processor readable media of claim 21, and further for storing instructions operable to:
derive interference estimates for the multiple data streams; and
determine the degrees of resource reuse for the multiple data streams based on the interference estimates.

23. The non-transitory processor readable media of claim 21, and further for storing instructions operable to:
obtain at least one initial channel quality indicator (CQI) value for the multiple data streams;
derive at least one revised CQI value based on the at least one initial CQI value and the at least one correction factor; and
select the at least one transmit format based on the at least one revised CQI value.

24. The non-transitory processor readable media of claim 21, and further for storing instructions operable to:
determine a new resource assignment based on the at least one transmit format, and
perform another iteration of determining the degrees of resource reuse, determining at least one correction factor, and selecting at least one transmit format if the new resource assignment is different from the initial resource assignment.

* * * * *